J. F. PRICE.
COTTON-HARROW AND CHOPPER.
No. 193,830. Patented Aug. 7, 1877.
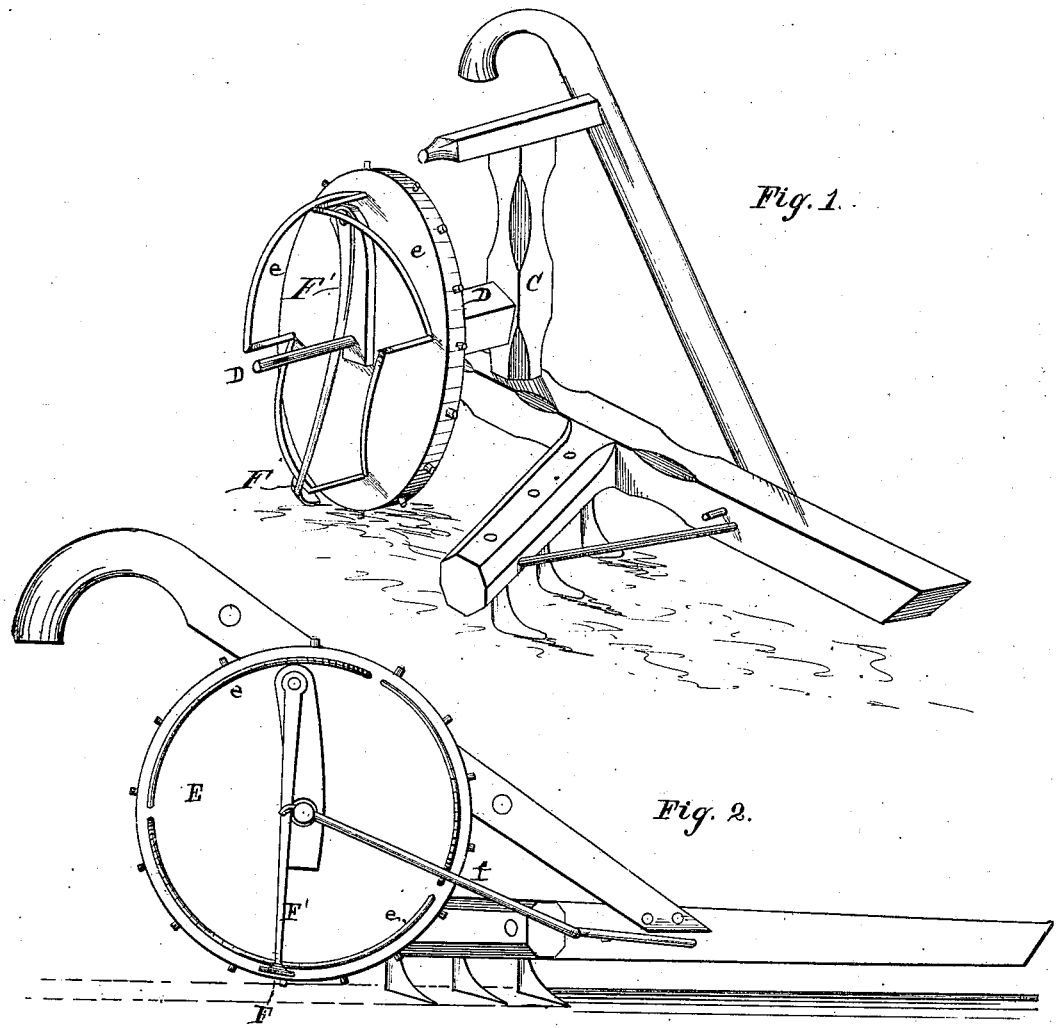
Witnesses:
J. N. Pigg
C. Y. Chapman
Inventor:
J F Price

UNITED STATES PATENT OFFICE.

JOHN F. PRICE, OF LINCOLN, TENNESSEE.

IMPROVEMENT IN COTTON HARROW AND CHOPPER.

Specification forming part of Letters Patent No. 193,830, dated August 7, 1877; application filed November 16, 1876.

*To all whom it may concern:*

Be it known that I, JOHN F. PRICE, of Lincoln, Tennessee, have invented a Cotton Harrow and Chopper, of which the following is a specification:

In the drawings, Figure 1 is a perspective view of the chopper with one handle and the outer brace removed. Fig. 2 is a side view.

The chopper may be attached to a harrow or any cotton-cultivator.

The different parts of the chopper are a wheel, E, with four arms or cams, $e$, and a hoe, F, with a spring-shank, F', attached to the wheel, and which works over the arms or cams as the wheel revolves. As the hoe passes from each arm it strikes and continues its successive strokes with the revolution of the wheel.

The wheel is attached to the scraper or harrow by an axle or shaft, D, passing through the center of the wheel and through the upright or standard C, which is set in the beam. The outer end of the axle is fastened by an arm, $f$, connecting it with the frame of the harrow.

The accompanying drawing will furnish an illustration of the specification.

What I claim is—

A cotton-chopper composed of the shaft D, the wheel E, having the cams $e$, and the hoe F, with its spring-shank F', in combination with the standard C of a cultivator-frame, and with the diagonal brace $f$, substantially as shown and described.

November 11, 1876.

J. F. PRICE.

Witnesses:
    J. N. PIGG,
    C. S. CHAPMAN.